United States Patent [19]
Lutz et al.

[11] Patent Number: 5,685,798
[45] Date of Patent: Nov. 11, 1997

[54] PLANETARY TRANSMISSION FOR A MOTOR OF A DRIVE SYSTEM OF A WHEEL OF A MOTOR VEHICLE

[75] Inventors: Dieter Lutz; Asmund Hey, both of Schweinfurt, Germany

[73] Assignee: Fichtel & Sachs AG, Schweinfurt, Germany

[21] Appl. No.: 491,094

[22] Filed: Jun. 16, 1995

[30] Foreign Application Priority Data

Jun. 18, 1994 [DE] Germany .................. 44 21 428.6

[51] Int. Cl.$^6$ .................. H02K 7/116; B60K 1/00; B60K 7/00; F16H 1/28
[52] U.S. Cl. .................. 475/331; 475/317; 180/65.5; 180/65.6
[58] Field of Search .................. 475/149, 317, 475/323, 331, 346; 180/65.5, 65.6

[56] References Cited

U.S. PATENT DOCUMENTS

| | | | |
|---|---|---|---|
| 2,258,328 | 10/1941 | Lee et al. | 180/65.5 X |
| 2,998,735 | 9/1961 | Elfes | 475/331 X |
| 4,441,570 | 4/1984 | Damm et al. | 475/331 X |
| 5,127,485 | 7/1992 | Wakuta et al. | 180/65.5 |
| 5,180,180 | 1/1993 | Yamashita et al. | 180/65.5 X |
| 5,390,347 | 2/1995 | Buri et al. | 475/317 X |
| 5,470,286 | 11/1995 | Fan | 475/331 |

FOREIGN PATENT DOCUMENTS

| | | | |
|---|---|---|---|
| 239198 | 1/1987 | European Pat. Off. | |
| 0249807 | 12/1987 | European Pat. Off. | |
| 579353 | 6/1933 | Germany | 180/65.6 |
| 1017697 | 4/1958 | Germany . | |
| 3725620 | 2/1989 | Germany . | |
| 4120262 | 5/1992 | Germany . | |
| 4308914 | 9/1993 | Germany . | |

OTHER PUBLICATIONS

VDI–Berichte No. 878; "Das elektrische Getriebe von Magnet–Motor für PKW und Omnibusse"; 1991; Dr. P Ehrhard; pp. 611–622.

*Primary Examiner*—Khoi Q. Ta
*Attorney, Agent, or Firm*—Nils H. Ljungman and Associates

[57] ABSTRACT

For the individual drive of a wheel of a motor vehicle, a planetary transmission can be combined into a single module with a motor. The planetary transmission has a sun wheel which on a motor shaft of the motor, a ring gear and a planet carrier with planet wheels which are rotationally mounted on journals. The planet carrier and the ring gear are non-rotationally connected to a support part which simultaneously forms the transmission housing, or to a driven shaft part which is rotationally mounted on the support part. The planet carrier is designed as a shaped sheet metal and comprises a sheet metal base wall which runs axially perpendicular to the axis of rotation of the planetary transmission, into which sheet metal base wall the journals are shaped in a cup shape. Projecting in the same direction as the journals from the outside circumference of the sheet metal base wall is a circumferential wall in which there is a toothed portion for the non-rotational coupling of the planet carrier with the support part or the driven shaft part. The planet wheels are held by a ring-shaped positioning disc on the shaped sheet metal part. Projecting axially from the outside circumference of the positioning disc are webs which are engaged between neighboring planet wheels, and which are welded to the sheet metal base wall. The planet carrier can be manufactured easily, and the forces which are exerted on it during operation are essentially equalized or compensated.

17 Claims, 5 Drawing Sheets

PLANETARY TRANSMISSION FOR A MOTOR OF A DRIVE SYSTEM OF A WHEEL OF A MOTOR VEHICLE

BACKGROUND OF THE INVENTION

1. Field of the Invention

This invention generally relates to a drive system of a motor vehicle wherein a motor is provided for driving at least one of the wheels. The motor is connected to the drive wheel or wheels by means of a transmission arrangement which connects the output of the motor to the drive shaft of the wheel or wheels. More particularly, the present invention relates to a planetary transmission which can be combined with a motor into a single component. Such a motor-planetary gear transmission is typically used in particular for the individual drive of a wheel of a motor vehicle, such as an electric automobile or electric bus.

2. Background Information:

VDI-Berichte (VDI-Reports) No. 878, 1991, Pages 611 to 622, discloses that the drive wheels of a motor vehicle can each have a separate motor. In this report, the motors are rotationally connected to the corresponding drive wheels by means of universal joint propeller shafts. The motors, which are motors having permanent magnet external rotors, are powered by means of an electronic commutation circuit from a generator, which generator, for its part, is driven by an internal combustion engine. The drive torque and the speed of the electric motors can be controlled electrically, so that mechanical transmissions etc., such as those which are located between the internal combustion engine and the drive wheels in conventional motor vehicles, are unnecessary.

To modify the drive torque and the speed of the motors to suitable wheel-side values, European Patent Application 249 807 discloses that it is possible to combine each of the motors with a spur gear transmission, and to install the motor/spur gear transmissions in pairs between the corresponding drive wheels of a drive axle of the motor vehicle. To employ the longest possible universal joint propeller shafts to reduce the bending angle of the components, the spur gear transmissions can be located next to one another adjacent the electric motor, on a side of the motor which is farther from the corresponding drive wheel. The motor can be designed as an external rotor motor.

German Patent Application 37 25 620 also discloses, on a motor vehicle with electric motors corresponding to the individual drive wheels, that the motors can be combined into a single module and that the motors can be located axially between the drive wheels, and facing their respective drive wheel to be driven. This application also discloses that a planetary transmission can be attached to the electric motor. For the planetary transmission, a sun wheel sits on the driven shaft of the electric motor, and a planet carrier, supporting the planet wheels, is connected to the drive wheel by means of a universal joint propeller shaft. A ring gear, like the sun wheel, is engaged with the planet wheels, and can be fixed relative to the electric motor by means of a multiple disc brake. When the brake is released, it becomes possible to uncouple the electric motor from the drive wheel.

In conventional, reducing planetary transmissions, i.e. planetary transmissions which reduce the speed from the drive side to the driven side, the planet wheels are mounted on journals of a planet carrier, and the planet carrier, for its part and depending on the design of the planetary transmission, is either mounted rotationally on a support part with a slight radial play, or is formed by the support part itself. In the event of unfavorable radial tolerances of the planetary transmission, the journals can be exposed to severe radial bending forces.

OBJECT OF THE INVENTION

The object of the present invention is to create a planetary transmission which is suitable in particular for the individual drive of a wheel of a motor vehicle, and which planetary transmission can be combined with an electric motor into a single module. It is also an object of the present invention to provide a more simply designed planet carrier.

SUMMARY OF THE INVENTION

The present invention proceeds from a planetary transmission of the type described above, and provides: a support part which can be connected to the electric motor, a driven shaft part which can be rotationally mounted on the support part, equiaxially with a motor shaft of the electric motor, and three transmission components which can be relatively rotatable, with respect to one another, around an axis of rotation defined essentially by the driven shaft part.

The three transmission components can include a first transmission component which has a sun wheel which is central in relation to the axis of rotation, a second transmission component which has a ring gear which coaxially surrounds the sun wheel, and a third transmission component which has a planet carrier and several planet wheels, and which is interposed between the sun wheel and the ring gear. The planet wheels can preferably be offset from one another in the circumferential direction, and can be rotationally mounted on the planet carrier axially parallel to the axis of rotation. The planet wheels preferably have circumferentially disposed teeth which can engage with teeth of both the sun wheel and the ring gear. The first transmission component, that is, the sun gear, can be non-rotationally connected to the motor shaft. The driven shaft part which drives the wheels, and the support part can each be non-rotationally connected to the other two of the three transmission components, that is, the ring gear, or the planet carrier.

The present invention teaches that the planet carrier of the second transmission component can be designed as an essentially ring-shaped sheet metal part, with a disc-shaped sheet metal base wall which runs essentially axially perpendicular to the axis of rotation. The journals for mounting the planet wheels to the carrier are preferably formed in one piece with the carrier. On the outside circumference of the carrier there can be a toothed portion for a non-rotational engagement between the carrier and either the driven shaft part or the support part.

Such a planet carrier can be manufactured very easily and economically. Since the torque which is exerted on the carrier is essentially transmitted by means of its external toothed portion and an opposite toothed portion corresponding to the external toothed portion in the part to be non-rotationally connected to the planet carrier, the planet carrier and thus the planet wheels mounted on the planet carrier can be set, or adjusted radially in relation to the sun wheel and to the ring gear. In this manner, radial bending forces, such as those which can occur in conventional planetary transmissions on the journals, can be eliminated. The planet carrier, which is essentially inserted loosely into the driven shaft part or the support part, can of course be fixed in place axially, although preferably with play. The planet wheels can be provided, in the axial direction, with straight toothed portions or with helically toothed portions. The slight axial forces produced by the toothed portions can be absorbed by the axial positioning of the planet carrier.

To stiffen the shaped sheet metal part and to enlarge the flank surfaces of the toothed portion when higher torques must be transmitted, the shaped sheet metal part, on its outside circumference, can be provided with a circumferential wall which projects essentially axially from the sheet metal base wall. The circumferential toothed portion can preferably be formed into this circumferential wall. The circumferential wall and the journals preferably project axially in the same direction from the sheet metal base wall, to thereby keep the axial space occupied by the transmission relatively small, i.e., corresponding to essentially the necessary thickness of the planet gears. The circumferential wall can appropriately overlap the journals completely in the axial direction, so that the total axial depth of the planet carrier can be used for the transmission of torque. If the ring gear is rotationally connected to the driven shaft part, the circumferential wall surrounds the ring gear on the radial outside over at least a portion of its axial length.

The planet gears, or wheels are appropriately positioned axially on the shaped sheet metal part, so that the planet carrier, with the planet wheels, forms an integral module which is easy to manipulate. The planet wheels can preferably be fastened individually to their journals, e.g. by circlips, retaining rings, or similar devices. Alternatively, in one preferred configuration of the present invention, the shaped sheet metal part, on the side of the planet wheels axially farther from the sheet metal base wall, can form a positioning ring which holds all the planet wheels in common, and which positions the planet wheels axially on the journals.

Such a positioning ring can appropriately be designed as a ring-shaped disc, and can be fastened to the journals. Alternatively, the positioning ring could also preferably be firmly connected to the sheet metal base wall in the circumferential direction by webs located between neighboring planet wheels. In this manner, the positioning ring can also contribute to increasing the stiffness of the shaped sheet metal part.

The webs can preferably be spacer rivets or similar devices, but the webs can alternatively be preferably molded in one piece on one circumferential edge. It has thereby been found to be favorable if the webs are provided on the radially outer circumferential edge, since that is where more space is generally available between the planet wheels. Thus, the webs can be realized in a more stable manner. The webs can also be riveted by means of rivet projections on their ends to the sheet metal base wall. It has been determined however, that the planet carrier can be stiffened to an even greater degree if the webs are welded to the sheet metal base wall, in particular over their entire circumferential length.

The ring-shaped disc which forms the positioning ring can have holes in which the journals can be loosely engaged, or in which they can be fastened by means of spot welds, for example, to thereby hold the journals on both ends. But embodiments are also favorable in which the ring-shaped disc is formed as a disc which is solid in its ring-shaped body, and which projects radially on both sides beyond the journals. The ring-shaped disc thus has a material cross section which is not reduced, and which can therefore make an increased contribution to the stiffening of the planet carrier.

Since the journals, when they are formed in one piece with the shaped sheet metal part, can be pressed out from the sheet metal base wall, the journals appropriately have additional bearing sleeves which provide for a cylindrical bearing cross section with close tolerances.

The journals can be in the shape of sleeves with interconnected open passages. But to make the journals as rigid as possible, the journals can be closed on their ends farther from the sheet metal base wall by cup-shaped covers which are connected to them.

The electric motor to be combined into a module with the planetary transmission can preferably be designed as an external rotor motor. The motor can preferably have a ring-shaped stator which encloses a cavity and a ring-shaped external rotor. The rotor can preferably be, in particular, a permanent magnet external rotor. Such external rotor motors have comparatively small axial dimensions, but can still be designed for high outputs. The motor-transmission module which incorporates such an external rotor motor can also be designed so that it is particularly flat in the axial direction, that is, has a relatively short axial dimension. For this purpose, the driven shaft can be mounted by means of a first roller bearing system on one axial side of the plane of rotation of the planet wheels on the support part, and the support part can be provided with a bearing extension which encloses the motor shaft and extends axially into the cavity of the stator. On this bearing extension the motor shaft can be mounted by means of a second bearing system on the side of the plane of rotation of the planet wheels axially farther from the first roller bearing system for the driven shaft. In this manner, the planetary transmission can extend at least partly into the cavity of the stator, and the axial length of the module can be reduced.

In the configuration described immediately above, the support part can also form a sealed transmission housing. For this purpose, the driven shaft part can be designed as a module which is axially tightly sealed. The side of the first roller bearing system which is axially farther from the planet wheels can be sealed by a first kinetic seal with respect to the support part, which kinetic seal preferably axially encloses the planetary transmission radially externally. For its part, the motor shaft can be sealed by means of a second kinetic seal in relation to the bearing extension.

It should be understood that when the word "invention" is used in this application, the word "invention" includes "inventions", that is, the plural of "invention". By stating "invention", Applicants do not in any way admit that the present application does not include more than one patentably and non-obviously distinct invention, and maintains the possibility that this application may include more than one patentably and non-obviously distinct invention. The Applicants hereby assert that the disclosure of this application may include more than one invention, and, in the event that there is more than one invention, that these inventions may be patentable and non-obvious, one with respect to the other.

One aspect of the invention resides broadly in a planetary transmission for a drive train of a motor vehicle, the drive train having motor apparatus for generating mechanical power, the motor apparatus having an output shaft for outputting mechanical power and apparatus for rotating the output shaft for outputting mechanical power, a housing disposed about at least a portion of the motor apparatus, at least one wheel for receiving mechanical power from the motor to drive the motor vehicle, and a drive shaft connected to the at least one wheel for transferring mechanical power to the at least one wheel, the planetary transmission for connecting the output shaft of the motor apparatus to the drive shaft of the drive train for rotating the drive shaft with the output shaft, the planetary transmission comprising: a sun gear; apparatus for non-rotatably connecting the sun gear to the output shaft for rotation of the sun gear with the output shaft; a ring gear disposed substantially concentrically about the sun gear; apparatus for non-rotatably connecting the ring gear to one of: the housing and the drive shaft; a plurality of planet gears disposed about the sun gear, between the sun gear and the ring gear, each of the plurality of planet gears being intermeshed with both the sun gear and the ring gear; a planet gear carrier for rotatably mounting the plurality of planet gears between and intermeshed with the sun gear and the ring gear; and the planet gear carrier comprising apparatus for holding the plurality of planet gears with the planet gear carrier for holding the plurality of planet gears and the planet gear carrier as an integral, unitary unit at least during assembly of the planetary transmission.

Another aspect of the invention resides broadly in a method of assembling a planetary transmission in a drive train for a motor vehicle, the drive train having motor apparatus for generating mechanical power, the motor apparatus having an output shaft for outputting mechanical power and apparatus for rotating the output shaft for outputting mechanical power, a housing disposed about at least a portion of the motor apparatus, at least one wheel for receiving mechanical power from the motor apparatus to drive the motor vehicle, a drive shaft connected to the at least one wheel for transferring mechanical power to the at least one wheel, and the planetary transmission for connecting the output shaft of the motor apparatus to the drive shaft of the drive train for rotating the drive shaft with the output shaft, the planetary transmission comprising: a sun gear; apparatus for non-rotatably connecting the sun gear to the output shaft for rotation of the sun gear with the output shaft; a ring gear disposed substantially concentrically about the sun gear; apparatus for non-rotatably connecting the ring gear to one of: the housing and the drive shaft; a plurality of planet gears disposed about the sun gear, between the sun gear and the ring gear, each of the plurality of planet gears being intermeshed with both the sun gear and the ring gear; a planet gear carrier for rotatably mounting the plurality of planet gears between and intermeshed with the sun gear and the ring gear; the planet gear carrier comprising apparatus for holding the plurality of planet gears with the planet gear carrier for holding the plurality of planet gears and the planet gear carrier as an integral, unitary unit at least during assembly of the drive train; the method comprising the steps of: providing the motor apparatus having the output shaft for outputting mechanical power and the apparatus for rotating the output shaft for outputting mechanical power; disposing the housing about at least a portion of the motor apparatus; providing the at least one wheel for receiving mechanical power from the motor apparatus to drive the motor vehicle; providing the drive shaft; connecting the drive shaft to the at least one wheel for transferring mechanical power to the at least one wheel; providing the planetary transmission for connecting the output shaft of the motor apparatus to the drive shaft of the drive train for rotating the drive shaft with the output shaft; the providing of the planetary transmission comprising: providing the sun gear; non-rotatably connecting the sun gear to the output shaft for rotation of the sun gear with the output shaft; providing the ring gear; disposing the ring gear substantially concentrically about the sun gear; non-rotatably connecting the ring gear to the one of: the housing and the drive shaft; providing the integral, unitary unit of the plurality of planet gears and the planet gear carrier as a single component, the providing of the integral, unitary unit comprising the steps of: providing the planet gear carrier; rotatably mounting the plurality of planet gears on the planet gear carrier; holding the plurality of planet gears on the planet gear carrier to provide the integral, unitary unit; disposing the integral, unitary unit between the output shaft and the drive shaft; and intermeshing the plurality of planet gears with both the sun gear and the ring gear.

A further aspect of the invention resides broadly in a drive train of a motor vehicle, the drive train comprising: motor apparatus for generating mechanical power, the motor apparatus having an output shaft for outputting mechanical power and apparatus for rotating the output shaft for outputting mechanical power; a housing disposed about at least a portion of the motor apparatus; at least one wheel for receiving mechanical power from the motor to drive the motor vehicle; a drive shaft connected to the at least one wheel for transferring mechanical power to the at least one wheel; and a planetary transmission for connecting the output shaft of the motor apparatus to the drive shaft of the drive train for rotating the drive shaft with the output shaft, the planetary transmission comprising: a sun gear; apparatus for non-rotatably connecting the sun gear to one of A and B: A) the output shaft for rotation of the sun gear with the output shaft; and B) the drive shaft for rotation of the sun gear with the drive shaft; a ring gear disposed substantially concentrically about the sun gear; apparatus for non-rotatably connecting the ring gear to one of C and D: C) the housing; and D) the other of A and B; a plurality of planet gears disposed about the sun gear, between the sun gear and the ring gear, each of the plurality of planet gears being intermeshed with both the sun gear and the ring gear; a planet gear carrier for rotatably mounting the plurality of planet gears between and intermeshed with the sun gear and the ring gear, the planet gear carrier comprising apparatus for holding the plurality of planet gears with the planet gear carrier for holding the plurality of planet gears and the planet gear carrier as an integral, unitary unit at least during assembly of the planetary transmission; and apparatus for slidably engaging the integral unitary unit and the other of items C and D for non-rotatably connecting the integral unitary unit with the other of items C and D.

BRIEF DESCRIPTION OF THE DRAWINGS

The present invention is explained in greater detail below with reference to the accompanying drawings, in which.

DESCRIPTION OF THE PREFERRED EMBODIMENTS

Figure 1:
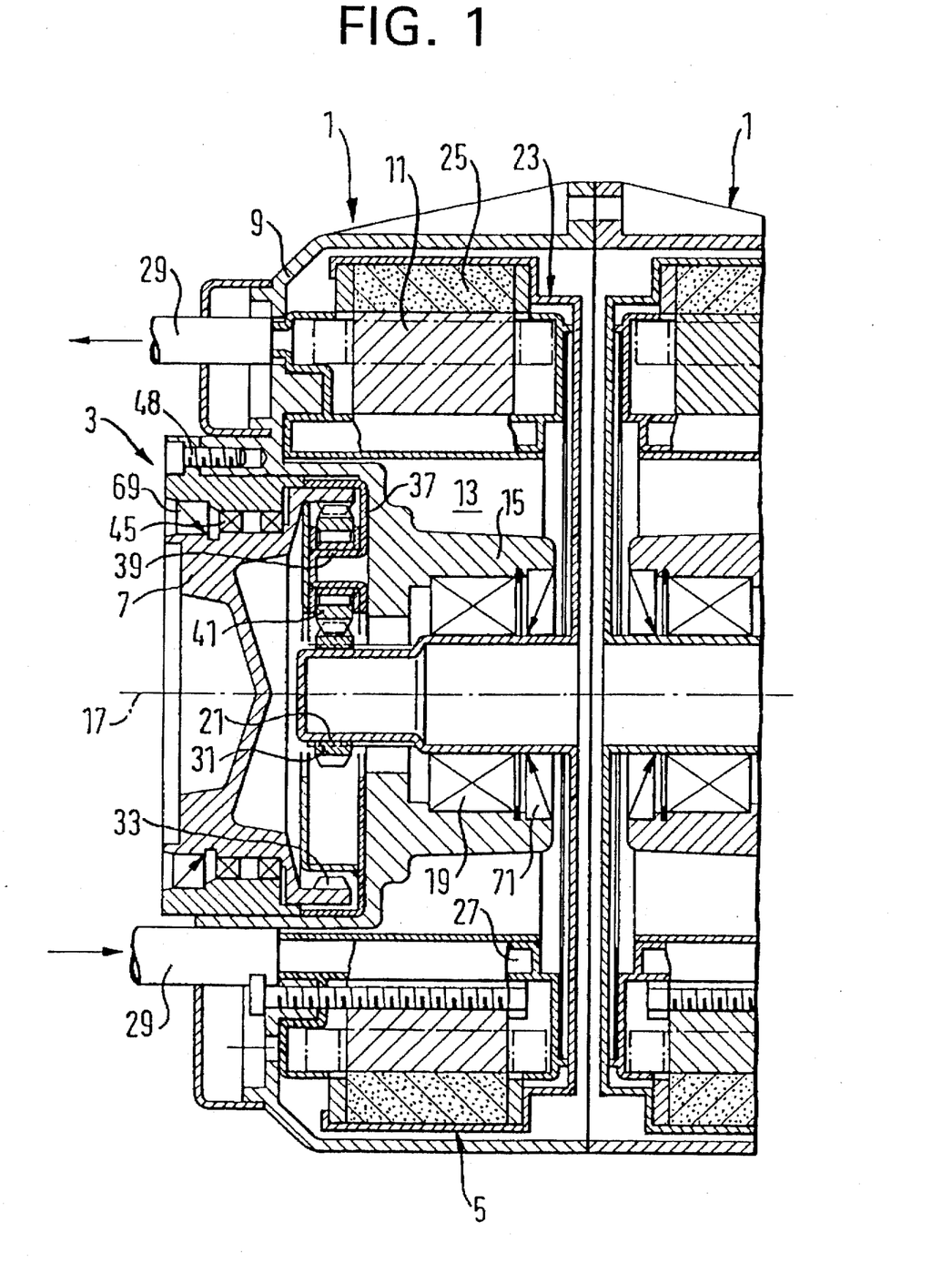
FIG. 1 shows an axial longitudinal section through a drive unit for the individual propulsion of the wheels of a motor vehicle.

The drive unit illustrated in FIG. 1 has two electric motor-transmission modules 1. The modules 1 can preferably be combined into a unit and can be installed between two drive wheels which are common to a single drive axle on the vehicle (see for example motors 213 and wheels 205 in FIG. 5). Each of the two modules 1 can preferably be provided with a planetary transmission 3 and an electric motor 5. The motor 5 can preferably be designed as a permanent magnet external rotor motor, which is described in more detail herebelow. The motor 5, by means of the planetary transmission 3 and a universal joint propeller shaft (not shown here but see item 219 in FIG. 5) connected to a driven shaft part 7 of the planetary transmission, essentially drives an individual wheel (205 in FIG. 5) of the motor vehicle. Since the two modules 1 of the drive unit can essentially be identical, the following description, which essentially relates to only one of the modules 1 could also be applied to the other module.

The module 1 has a support part which is designated 9 in general. On this support part 9 there can be positioned an essentially ring-shaped, sheet metal, or laminated stator 11 which is provided with field windings (not shown here). The stator 11 defines and surrounds a cavity 13. On the support part 9 there can preferably be provided, within the cavity 13, a bearing extension 15. This extension 15 can essentially extend equiaxially with an axis of rotation 17 of the driven shaft part 7.

A motor shaft 21 can be rotationally mounted in the bearing extension 15 by means of a roller bearing system 19, essentially equiaxially with the driven shaft part 7. The motor shaft 21, on its end farther from the driven shaft part 7, can be connected to, or be a part of, a permanent magnet external rotor 23. The rotor 23 can preferably have essentially a cup shape and can circumferentially surround the stator 11, external to the stator 11. Alternatively, an internal rotor could be used, and since the design of such would essentially be known to one in the art, is not discussed in any greater detail herein. In the circumferential area which radially externally surrounds the stator 11, the rotor 23 can have a multiplicity of permanent magnets 25 corresponding to the poles of the stator 11. The polarity of the magnets 25 would essentially alternate in the circumferential direction. The power and the speed of the electric motor 5 can be controlled by means of electronic commutator circuits connected to the field windings of the stator 11. Such commutator circuits are not shown or described in any greater detail as they are generally known and comprise circuits which cause the electric current direction in the windings to be reversed to thereby alternate the polarity of the magnetic field produced by the windings.

Since the electric motor 5 is essentially designed for relatively high outputs, and can thereby generate a significant amount of heat, in the cavity 13 next to the stator 11, there can be an annular channel 27 which can be connected to a coolant circuit by means of feed lines 29.

In the depicted embodiment, the planetary transmission 3 comprises a sun wheel 31 which is non-rotationally attached to the free end of the motor shaft 21. The sun wheel 31 is essentially surrounded equiaxially, in turn, by a ring gear 33, which ring gear 33 can be permanently located on the driven shaft part 7. In a housing chamber 35 of the support part 9, which chamber 35 essentially equiaxially surrounds the axis of rotation 17, and as is illustrated most clearly in FIGS. 2 and 3, a planet carrier 37 can be inserted. The planet carrier 37 can support several planet wheels 41, in this case five planet wheels 41, which are offset in the circumferential direction on journals 39. This planet carrier 37 can be designed as a separate, integral or unitary component in conjunction with the planet wheels 41, so that the planetary transmission can essentially have a simpler design, which after preassembling of the carrier 37 and planet wheels 41 away from the module 1, can then simply be inserted into place as a single component.

Figure 3:
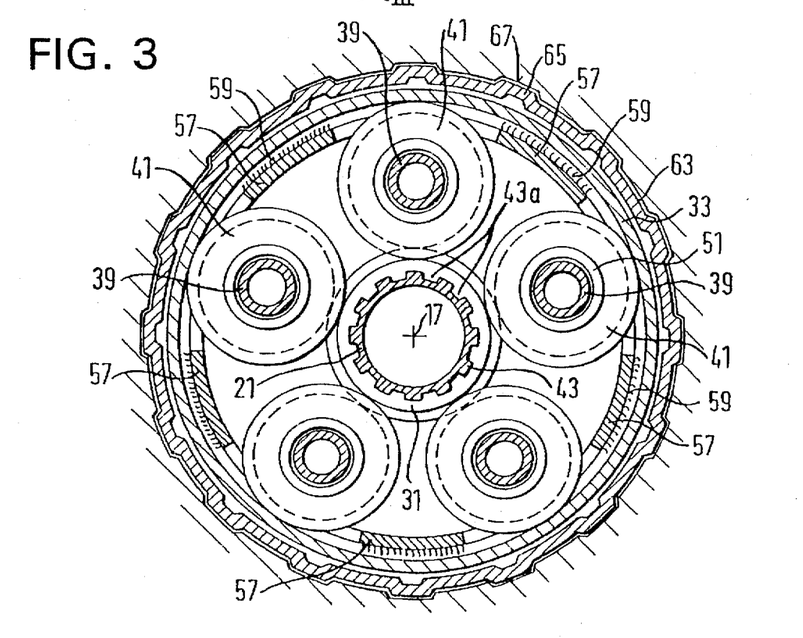
FIG. 3 shows an axial cross section through the planetary transmission, viewed along a Line III—III in FIG. 2.
Figure 4:
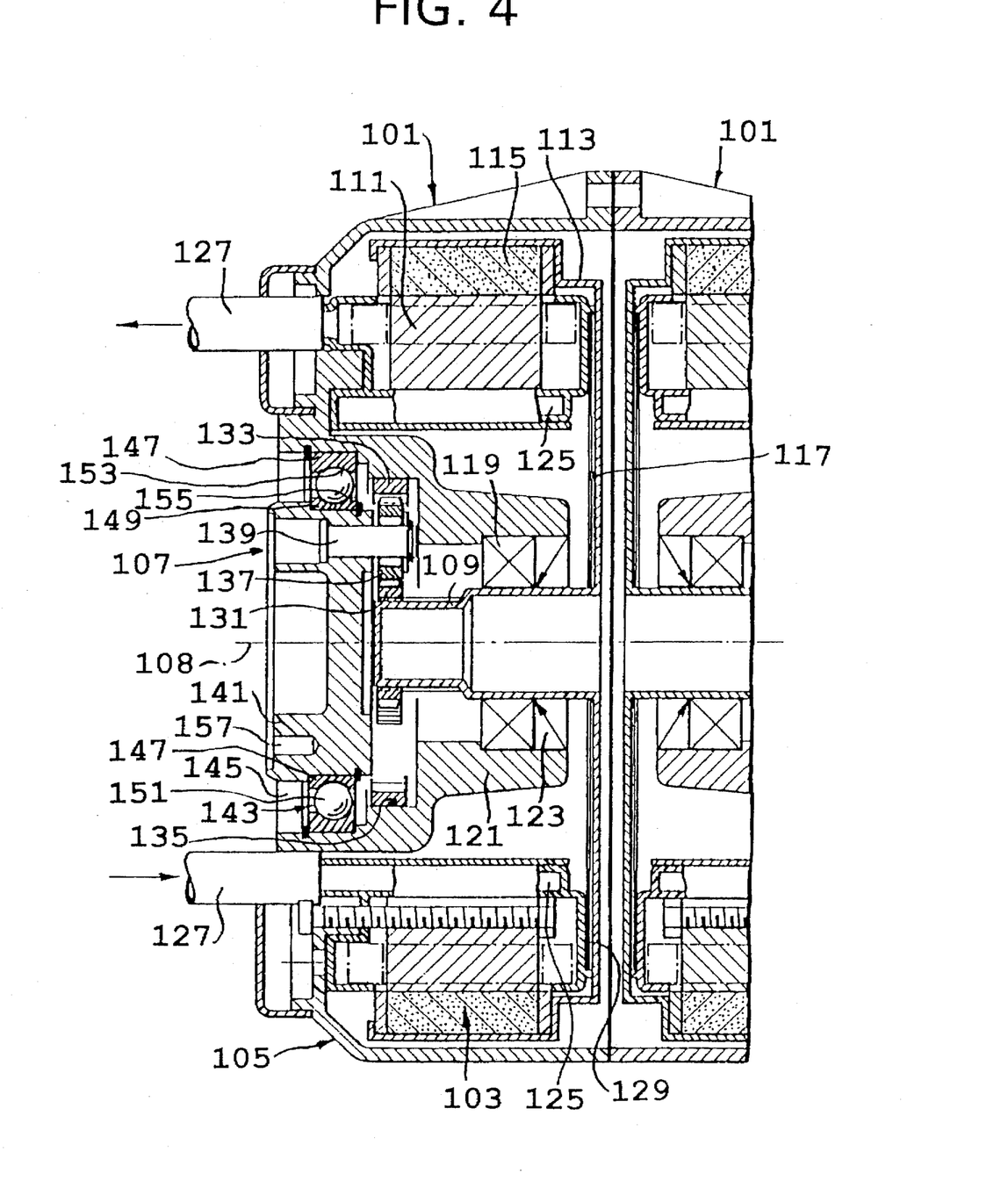
FIG. 4 shows an axial longitudinal section through an alternative embodiment of an electric motor transmission component and the bearing assembly arrangement thereof.

The sun wheel 31 can be non-rotationally engaged with the motor shaft 21, and as illustrated, one such type of engagement can be formed by means of an externally toothed portion 43 (see FIG. 2) of the shaft 21, and corresponding internal toothing 43a (see FIG. 3) of the sun wheel 31. The planet wheels 41 engage both with the sun wheel 31 and also with the driven shaft part 7. The driven shaft part 7 can be non-detachably held in place by means of overlapping shoulder portions 44a of the driven shaft part 7 and 44 of a housing part 46, which housing part 46 can be fastened to the support part 9 by means of a fastening element such as screws 48 shown in FIG. 1. The driven shaft part 7 can be rotationally mounted in the support part 9 by means of a roller bearing system 45 located on the side of the plane of rotation of the planet wheels 41 axially farther from the roller bearing system 19. An alternative bearing arrangement is shown in FIG. 4, discussed further hereinbelow.

Figure 2:
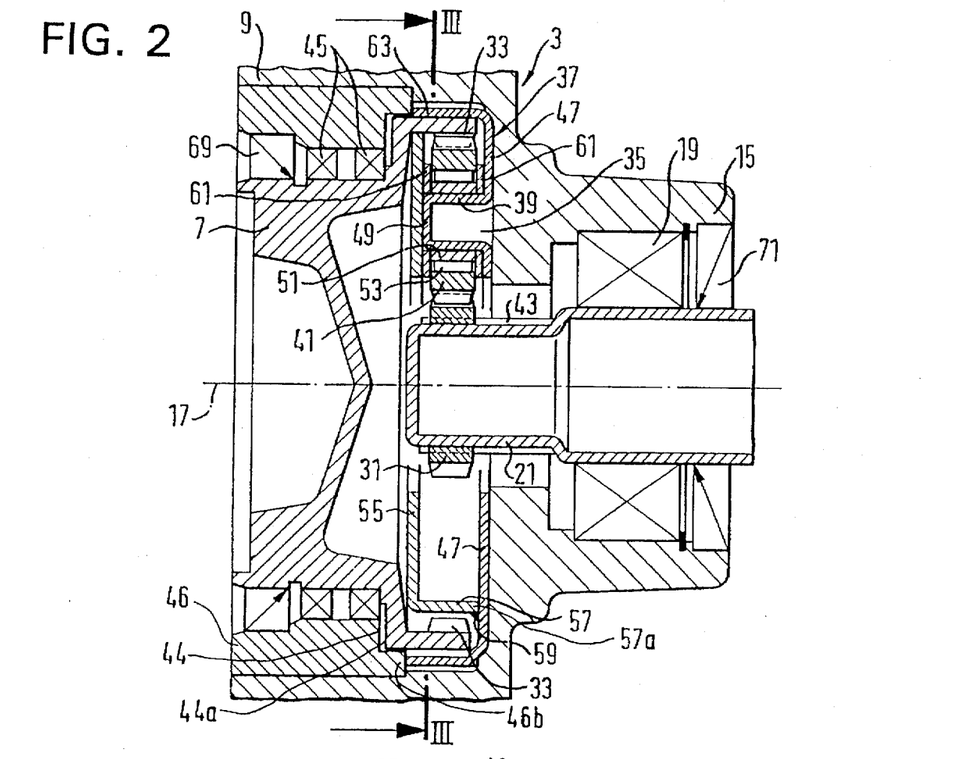
FIG. 2 shows an enlarged axial longitudinal section of a planetary transmission of the drive unit.

The planet carrier 37 can be designed as an essentially ring-shaped sheet metal part which can have a sheet metal base 47 which runs axially perpendicular to the axis of rotation 17. The journals 39 can be formed into this base 47, as one piece with the base 47. In addition, the journals can essentially be formed as sleeves which are closed in a cup-like manner by covers 49 and which run axially parallel to the axis of rotation 17. Sleeves 51 can be inserted over the journals 39 to compensate for any tolerance, as the pressing of such journals 39 into a sheet metal plate can tend to not be very exact. The sleeves 51 can form the tracks for rollers or needles 53 of roller or needle bearings which guide the planet wheels 41 radially on the journals 39.

All the planet wheels 41 can be held jointly on the journals 39 in the axial direction by a ring-shaped positioning disc 55. The positioning disc 55 can essentially run parallel to the sheet metal base 47, and can project radially outwardly to both sides beyond the journals 39. Distributed in the circumferential direction on the outside circumference of the positioning disc 55, there can be several webs 57 on the disc 55, which webs 57 project axially in the circumferential direction between neighboring planet wheels 41 toward the sheet metal base 47 of the planet carrier, or shaped sheet metal part 37. The disc 55 can then preferably be fastened to the metal base 47 to form the integral component that makes up the part 37. One manner in which such a connection can be made is by welding the free ends 57a of webs 57 to the base 47 by means of welds 59, essentially over the entire circumferential length of the free ends 57a of the webs 57. To fix the planet wheels 41 axially in position within the shaped sheet metal part 37, wear, or adapter rings 61 can be located axially on both sides of the planet wheels 41 about the journals 39.

The shaped sheet metal part 37 can be bordered radially outwardly by a circumferential wall 63. This wall 63 can preferably also be formed integrally with the metal part 37 to project in the same direction as the journals 39 from the sheet metal base part 47. Shaped into the circumferential wall 63, there can be a toothed portion 65 (see FIG. 3), which toothed portion 65 essentially corresponds to an opposite toothed portion 67 in the chamber 35 of the support part 9. The interlocking toothed portions 65 and 67 can hold the shaped sheet metal part 37 non-rotationally, but with some radial play, on the support part 9. As shown in FIG. 2, the shaped sheet metal part 37 can also be axially fixed to the support part 9 by means of the circumferential wall 63. This axial fixing can again be brought about by means of the housing part 46, which housing part 46 can include a projecting portion 46b that axially engages with an end surface of the circumferential wall 63 to thereby axially retain the sheet metal part 37 in place. The radial play of the shaped sheet metal part 37 in the support part 9 essentially can make it possible to guide the planet carrier onto the support part 9, essentially eliminating any secondary bending forces. As such, this toothed arrangement formed by toothed portions 65 and 67 also permits simple assembly of the transmission components with the support part 9.

The support part 9, with its chamber 35 which is closed in the radial direction, can simultaneously form a lubricant-tight housing which can be closed on the wheel side by the solid surface of the driven shaft part 7. On the side of the roller bearing system 45 which is axially farther from the planet wheels 41, the driven shaft part 7 can be sealed by a kinetic seal 69 with respect to the support part 9. An additional kinetic seal 71 can be provided to seal the motor shaft 21 with respect to the bearing extension 15 of the support part 9. A kinetic seal, for example, could essentially be any type of seal which is able to form a seal with a moving part, and such types of seals would essentially be known to those in the art, and are therefore not discussed in any greater detail herein.

Figure 2A:
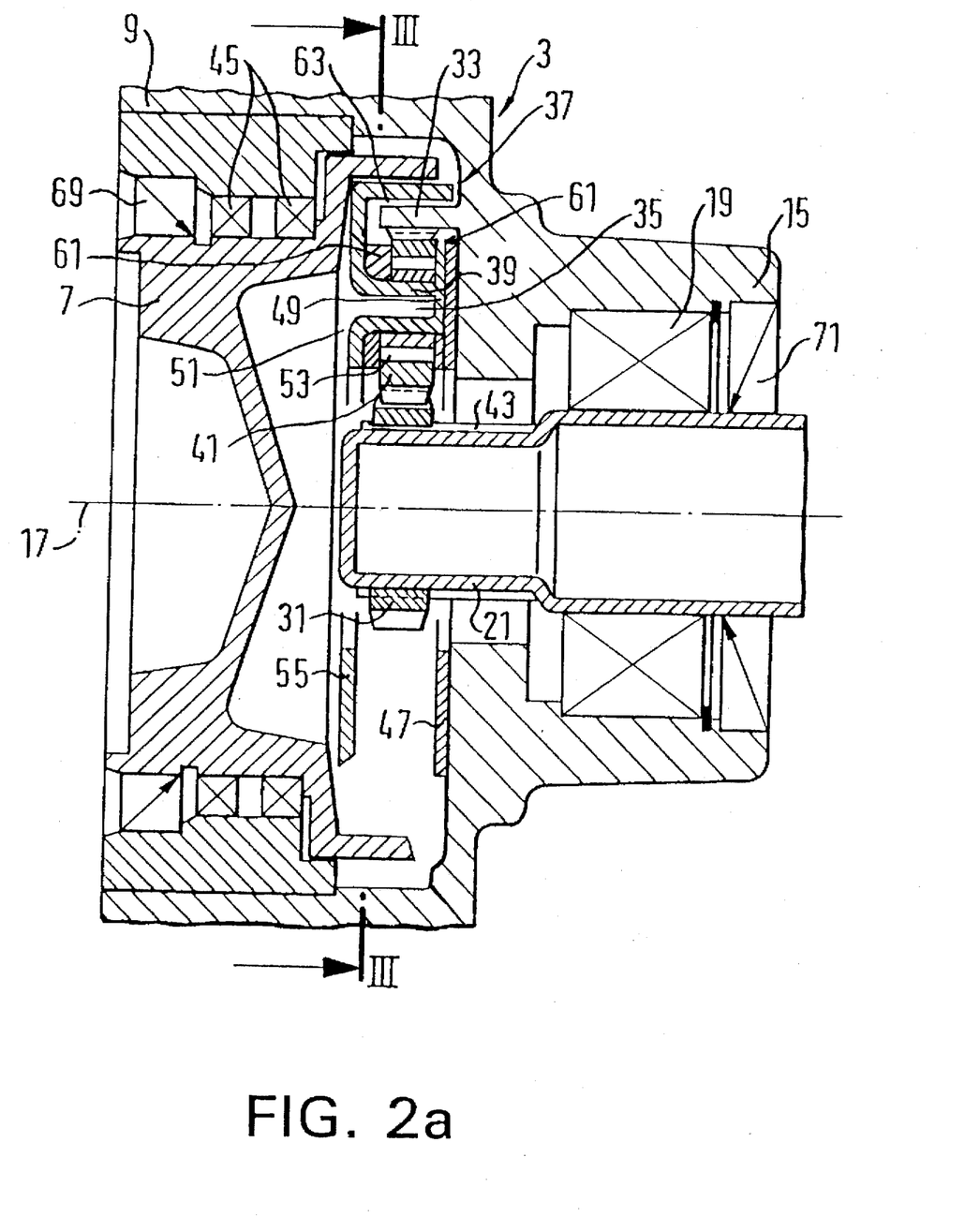
FIG. 2a shows a variant of the embodiment depicted in FIG. 2.

In the illustrated embodiment, the shaped sheet metal part which forms the planet carrier 37 is non-rotationally connected by means of its toothed portion 65 to the support part 9, while the ring gear 33 is held on the driven shaft part 7. In a variant, such as the depicted embodiment of FIG. 2a, the shaped sheet metal part can be non-rotationally coupled to the driven shaft part 7 by means of the toothed portion 65 of its circumferential wall, while the ring gear 33 would then be provided on the support part 9. In both variants, the ring gear 33 can be shaped in one piece on the respective component of the planetary transmission, or for its part, can be non-rotationally but insertably connected to the component by means of an external toothed portion. The latter variant in particular can be advantageous, since with the same configuration of the support part 9 and of the driven shaft part 7, these two components can then be designed so that they are essentially identical in both variants.

FIG. 4 shows two essentially identical electric motor-transmission components 101 combined into a single component. Each of the electric motor-transmission components can be connected by means of a universal joint propeller shaft (not shown here, but see FIG. 5, discussed below) to one of two wheels which can be jointly part of a drive axle of a motor vehicle. The electric motor-transmission component can be mounted (in a manner not illustrated in any additional detail here, but see FIGS. 5 and 6, discussed below) between the two drive wheels on a bolster, or on the body of the vehicle.

Each of the two components 101 comprises an external rotor electric motor 103. The electric motors 103 can each be combined by means of a support part, designated 105 in general, with a planetary transmission 107 to form an independent mechanical component. Since the two components 101 can essentially be identical, only one of the units will be explained in detail below.

The external rotor motor 103 preferably has a ring-shaped laminated stator 111, which stator 111 encloses the axis of rotation 108 of a motor shaft 109. On the outer circumference of the stator 111, a number of magnetic poles (not shown in any detail) can be formed, and the stator 111 can support corresponding field windings (also not shown). An essentially pot-shaped rotor 113 can be firmly connected to one end of the motor shaft 109, and a rotor 113 can be provided to surround the stator 111 radially outwardly in a ring-shaped manner. The rotor 113 preferably has a number of permanent magnets 115 disposed radially opposite the poles of the stator 111. The polarity of the permanent magnets 115 alternate in the circumferential direction. The field windings of the stator 111 can be excited by an electronic commutation device (also not shown in any detail), whereby the power, direction of rotation and the torque of the external rotor motor 103 can be controlled by controlling the commutator device.

In the illustrated embodiment, the permanent magnets 115 can be inserted in a laminated, or sheet metal body designated 117 in general. The motor shaft 109 can be integrally molded as a laminated tubular part onto this body 117. The motor shaft 109 can be rotationally mounted in a bearing extension 121 by means of a ball bearing 119, e.g. a single-row ball bearing. This bearing extension 121 can extend from the side of the planetary transmission 107, in this case axially into the cavity of the external rotor motor 103 formed by the ring-shaped stator 111. A kinetic seal 123 can be provided to seal the motor shaft 109 in relation to the bearing extension 121 on the side of the ball bearing 119 axially farther from the planetary transmission 107.

In the cavity formed by the stator 111, since the external rotor motor 103 can be designed for high drive powers, there can be a ring-shaped channel 125 which can be connected to a coolant circuit to cool the stator 111 by means of connections 127. Indicated at 129, the are elements of a phase angle sensor for detecting the phase angle between the rotor 113 and stator 111. This phase angle sensor 129 can be connected to the commutator circuit.

An alternative embodiment of a planetary transmission, designated 107, is also shown in FIG. 4. In FIG. 4, there is shown a sun wheel 131 which is non-rotationally attached to the free end of the motor shaft 109. This sun wheel 131 can essentially be coaxially surrounded by a ring gear 133 firmly inserted into the support part 105. The ring gear 133 can thereby sit in a chamber 135 of the support part 105 and can make a transition into the bearing extension 121. Engaged with the sun wheel 131 and with the ring gear 133 there can be several planet wheels 137 which can be distributed in the circumferential direction and can be mounted axially parallel to the axis of rotation 108 on bearing necks 139 of a driven shaft part 141. The driven shaft part 141 can therefore also be used as a planet carrier, of the planetary transmission 107. The driven shaft part 141 can essentially be in the shape of a disc, and can be fixed radially and axially on its outside circumference by means of a single, single-row ball bearing 143 in the chamber 135 of the support part 105. The ball bearing 143 can be located on the side of the plane of rotation of the planet wheels 137 axially farther from the ball bearing 119. The ball bearing 143 can preferably have radial play, so that the driven shaft part 141 and thus the planet wheels 137 can be displaced radially by a small amount with respect to the support part 105. The toothed portions of the planet wheels 137 can thus also move relative to the toothed portion of the ring gear 133. The planet wheels 137 can thereby also be used to support the driven shaft part 141. Since the motor shaft 109, in the area between the sun wheel 131 and the bearing 119, can be designed as a laminated, sheet metal part, the motor shaft 109 can essentially have radially elastic properties, so that secondary bending forces between the planet wheels 137 and the sun wheel 131 can be equalized.

The ball bearing 143 preferably has an inner ring 147 which sits on the driven shaft part 141, an outer ring 149 which coaxially surrounds the inner ring 147, and a number of balls 151 located in a row. The balls 151 essentially run in raceways 153, 155 of the inner ring 147 and of the outer ring 149, which raceways 153, 155 can be preferably radially opposite one another. To achieve radial play between the inner ring 147 and the outer ring 149, the radius of the raceways 153, 155 can be slightly larger, e.g. by between about 2% to about 3%, than the radius of the balls 151.

The chamber 135 forms a housing for the planetary transmission 107, which housing tan be closed externally by the driven shaft part 141. This shaft part 141 can preferably be designed as a solid disc. In addition, while the kinetic seal 123 seals the housing with respect to the motor side, a kinetic seal 145 located between the driven shaft part 141 and the support part 105, on the side of the ball bearing 143 axially farther from the plane of rotation of the planet wheels 137, can provide an external seal for the transmission housing.

In the embodiment described above, the driven shaft part 141 can be used as a planet carrier for the planetary transmission 107. It goes without saying that if necessary, the ring gear can also be located on the driven shaft part, in which case the planet wheels would be supported by means of their journal necks on the support part. In both variants, the driven shaft part 141 can be used directly for fastening the transmission-side joint of a universal joint propeller shaft connected to the wheel. Suitably threaded holes are shown at 157. Instead of the external rotor motor 103 described in the embodiment, electric motors of another design can also be used, in particular internal rotor motors, or electric motors with rotors mounted axially on both sides.

Figure 5:
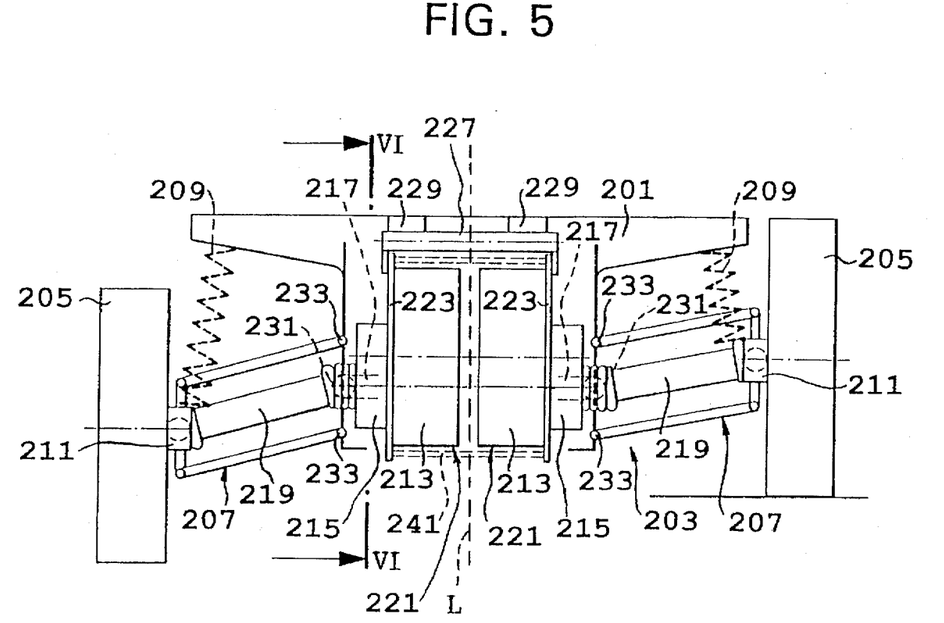
FIG. 5 is a schematic view of a drive axle of a motor vehicle, viewed in the direction of travel, with one embodiment of an electrical drive assembly.

FIG. 5 shows a bolster 201, and a drive axle designated in general by the number 203, of a motor vehicle with two drive wheels 205. FIG. 5 essentially shows a view in the direction of travel, wherein the drive wheels 205 can be located on both sides of a vehicle longitudinal center plane (L). The drive wheels 205 can be guided by wheel guides 207, here shown as parallel control arm structures which can move essentially in the vertical direction of the vehicle on the bolster 201. The bolster 201 can sit flexibly on wheel mountings 211 in wheel suspensions 209. The left drive wheel 205 is shown in the rebound state, whereas, the right drive wheel 205 is shown in the deflected state. It is apparent that the wheel suspensions 209 and/or the wheel guides 207 can also be connected by hinges or supported in another manner, e.g. directly on the vehicle body.

Each of the two drive wheels 205 of the drive axle system 203 can be driven by a separate electric motor 213 by means of a transmission 215, the output, or driven shaft part 217 of which can be non-rotationally connected to the corresponding drive wheel 205 regardless of its instantaneous vertical position. The transmission 215 can preferably be located on the respective side of the electric motor 213 axially facing the corresponding drive wheel 205, and can be connected with it to form a component which is designated 221. The component 221 can comprise a support part 223 which can be common to the transmission 215 and to the electric motor 213, on which the driven shaft part 217 and the driven shaft 225 (see FIG. 6) of the electric motor 213 can be rotationally mounted by means of pivot bearings which are not illustrated in any further detail. The two components 221 can thus be located separately from one another axially in the space between the drive wheels 205. The components 221, for their part, can be connected into a unit by means of an auxiliary frame which, in this case, can be formed of several struts 227. The struts 227 can be attached by means of flanges to the support parts 223 and can be held by means of elastic rubber mounts 229 on the bolster 201.

It is apparent that the auxiliary frame can also be designed in another manner. It is essential only that the auxiliary frame define the spatial position of the two components 221 relative to one another and to the bolster 201. In particular, the auxiliary frame can also be an integral component of the bolster 201. The auxiliary frame can be designed so that transmission-side joints 231 of the universal joint propeller shafts 219 can essentially be located at the location of or in the vicinity of the instantaneous center of rotation of the drive wheels 205, in the example of the parallel control rod guide illustrated in FIG. 5, therefore, in the plane of the transmission-side control rod joints indicated by 233. The auxiliary frame connecting the components 221 to one another and to the bolster 201 therefore can make it possible to locate the component 221 so that the vertical movement of the drive wheels essentially does not cause any longitudinal offset of the transmission-side joints 231, so that comparatively short universal joint propeller shafts 219 can also be used.

Figure 6:
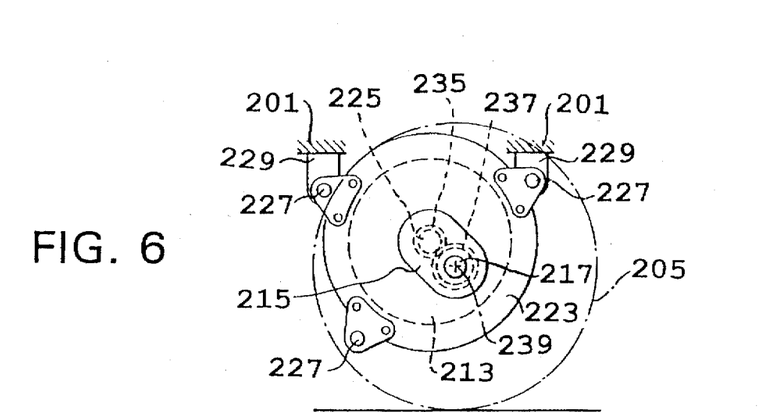
FIG. 6 is a schematic side view of the drive assembly, viewed along a Line VI—VI in FIG. 5.

As shown in FIG. 6, the driven shaft part 217 of the transmission 215 can preferably be offset axially parallel to the driven shaft 225 of the electric motor 213. The electric motor 213 can have an approximately cylindrical shape, whereby the driven shaft part 217 of the transmission 215 can be offset axially parallel to the driven shaft 225 of the electric motor 213, or radially inside the circumferential contour of the electric motor 213. By means of a suitable selection of the relative angular position of the electric motor 213, the position of the driven shaft part 217, in terms of its height and the position in the direction of travel, can be varied by a suitable selection of fastening points of the auxiliary frame on the support part 223, and adapted to the special requirements of the situation. The transmission 215 can, for example, be a reducing spur gear transmission with a pinion 235 which sits on the driven shaft 225 of the electric motor 213, and a gear wheel 237 formed by the driven shaft part 217.

One feature of the invention resides broadly in the planetary transmission which can be combined with an electric motor into a single module, in particular for the individual drive of a wheel of a motor vehicle, comprising a support part 9 which can be connected to the electric motor 5, a driven shaft part 7 which can be rotationally mounted equiaxially with a motor shaft 21 of the electric motor 5 on the support part 9, three transmission components which can rotate relative to one another around the axis of rotation 17, a first transmission component of which has a sun wheel 31 which is central in relation to the axis of rotation, a second transmission component which has a ring gear 33 which coaxially surrounds the sun wheel 31, and a third transmission component which comprises a planet carrier and several planet wheels 41 which are offset from one another in the circumferential direction, are rotationally mounted on the planet carrier axially parallel to the axis of rotation 17, and are engaged with the sun wheel 31 and the ring gear 33, the first transmission component can be non-rotationally connected to the motor shaft 21, and the driven shaft part 7 and the support part 9 are each non-rotationally connected to the other two of the three transmission components, characterized by the fact that the planet carrier of the second transmission component is designed as a ring-shaped sheet metal part 37, and has an essentially disc-shaped sheet metal base wall 47 which runs essentially axially perpendicular to the axis of rotation 17, in which sheet metal base wall 47 the journals 39 which serve as bearings for the planet wheels 41 are molded integrally (in one piece?), and on the outside circumference of which there is a toothed portion 65 for a non-rotational connection with one of the parts—i.e. the driven shaft part 7 or the support part 9.

Another feature of the invention resides broadly in the planetary transmission characterized by the fact that the shaped sheet metal part 37 has, on its outside circumference, a circumferential wall 63 which projects essentially axially from the sheet metal base wall 47, and in which the toothed portion 65 is shaped.

Yet another feature of the invention resides broadly in the planetary transmission characterized by the fact that the circumferential wall 63 and the journals 39 project axially in the same direction from the sheet metal base wall 47.

Still another feature of the invention resides broadly in the planetary transmission characterized by the fact that the circumferential wall 63 completely overlaps the journals 39 in the axial direction.

A further feature of the invention resides broadly in the planetary transmission characterized by the fact that the ring gear 33 is non-rotationally connected to the driven shaft part 7 and is externally surrounded over at least a portion of its axial length by the circumferential wall 63.

Another feature of the invention resides broadly in the planetary transmission characterized by the fact that the shaped sheet metal part 37, on the side of the planet wheels 41 farther from the sheet metal base wall 47, supports a positioning ring 55 which is common to all the planet wheels 41 and which axially positions the planet wheels 41 on the journals 39.

Yet another feature of the invention resides broadly in the planetary transmission characterized by the fact that the positioning ring 55 is designed as a ring-shaped disc and is firmly, or non-rotationally connected between neighboring planet wheels 41 in the circumferential direction by webs 57 with the sheet metal base wall 47.

Still another feature of the invention resides broadly in the planetary transmission characterized by the fact that the webs 57 are shaped in one piece on a circumferential wall, in particular on the radially outer circumferential wall of the positioning ring 55.

A further feature of the invention resides broadly in the planetary transmission characterized by the fact that the webs 57 are welded onto the sheet metal base wall 47.

Another feature of the invention resides broadly in the planetary transmission characterized by the fact that the ring-shaped disc 55 is formed as a solid disc which projects radially on both sides beyond the journals 39.

Yet another feature of the invention resides broadly in the planetary transmission characterized by the fact that the journals 39 also support bearing sleeves 51, on which the planet wheels 41 are mounted, in particular by means of roller bearing needles 53.

Still another feature of the invention resides broadly in the planetary transmission characterized by the fact that the journals 39 have a sleeve shape, and on their ends farther from the sheet metal base wall 47 are closed by covers 49 which are firmly connected to them.

A further feature of the invention resides broadly in the planetary transmission characterized by the fact that the driven shaft part 7 is mounted by means of a first roller bearing system 45 axially on one side of the plane of rotation of the planet wheels 41 on the support piece 9, that the electric motor 5 is designed as an external rotor motor, with a ring-shaped stator 11 which encloses a cavity 13 and a ring-shaped external rotor 23, in particular a permanent magnet external rotor, which encloses the stator 11 radially externally, that the support part 9 has a bearing extension 15 which extends axially into the cavity 13 of the stator 11 and encloses the motor shaft 21, on which bearing extension 15 the motor shaft is rotationally mounted, on the side of the plane of rotation of the planet wheels 41 axially farther from the fist roller bearing system 45, by means of a second bearing system 19.

Another feature of the invention resides broadly in the planetary transmission characterized by the fact that the support part 9 tightly encloses the planetary transmission 3 radially externally, that the driven shaft part 7 is designed as a component which is axially tightly closed, and is sealed on the side of the first roller bearing system 45 facing axially away from the planet wheels 41 by a first kinetic seal 69 with respect to the support part 9, and that the motor shaft 21 is sealed by means of a second kinetic seal 71 with respect to the bearing extension 15.

The components disclosed in the various publications, disclosed or incorporated by reference herein, may be used in the embodiments of the present invention, as well as, equivalents thereof.

Examples of flexplate components, which may be utilized in accordance with the embodiments of the present invention, may be found in the following U.S. Pat. No. 5,323,665, which issued to Rediker on Jun. 28, 1994; U.S. Pat. No. 5,184,524, which issued to Senia on Feb. 9, 1993; U.S. Pat No. 5,121,821, which issued to Poorman et al. on Jun. 16, 1992; and U.S. Pat. No. 4,672,867, which issued to Rodriguez on Jun. 16, 1987.

Examples of hybrid drive arrangements, such as internal combustion engine-electric generator arrangements, and components associated therewith, such as control arrangements and individual motors for driving corresponding wheels, may be found in the following U.S. Pat. No. 5,327,987, which issued to Abdelmalek on Jul. 12, 1994; U.S. Pat. No. 5,318,142, which issued to Bates et al. on Jun. 7, 1994; U.S. Pat. No. 5,301,764, which issued to Gardner on Apr. 12, 1994; U.S. Pat No. 5,249,637, which issued to Heidl et al. on Oct. 5, 1993; U.S. Pat. No. 5,176,213, which issued to Kawai et al. on Jan. 5, 1993; U.S. Pat. No. 5,327,992, which issued to Boll on Jul. 12, 1994; U.S. Pat. No. 5,291,960, which issued to Brandenburg et al. on Mar. 8, 1994; and U.S. Pat. No. 5,264,764, which issued to Kuang on Nov. 23, 1993.

Examples of electric and hybrid vehicles, and related components, may be or are disclosed in the following U.S. Pat. No. 5,251,721 entitled "Semi-hybrid Electric Automobile" to Ortenheim; U.S. Pat. No. 5,004,061 entitled "Electrically Powered Motor Vehicle" to Andruet; U.S. Pat. No. 5,289,100 entitled "System for Powering, Speed Control, Steering, and Braking" to Joseph; U.S. Pat. No. 5,265,486 entitled "Portable External Drive Assembly" to AAMCO Corporation; U.S. Pat. No. 5,289,890 entitled "Drive Unit for Electric Motor Vehicle" to Aisin; and U.S. Pat. No. 5,310,387 entitled "Differential Motor Drive" to Hughes Aircraft Company.

Additional examples of electric vehicles in which the present invention may be utilized may be or are disclosed in the following U.S. Pat. No. 5,166,584 entitled "Electric Vehicle" to Nissan; U.S. Pat No. 5,161,634 entitled "Electric Vehicle" to Kubota Corporation; and U.S. Pat. No. 5,150,045 entitled "Electric Automobile" to Kaisha.

Examples of planetary gear transmissions which may be utilized in accordance with the embodiments of the present invention, may be found in the following U.S. Pat. No. 5,120,282 entitled "Vehicle Transmission System" which issued on Jun. 9, 1992; U.S. Pat No. 5,035,158 entitled "Electric Shift and Transfer Case Apparatus With Control System Therefor" issued on Jul. 30, 1991; U.S. Pat. No. 5,007,887 entitled "Planetary Gear Transmission for Motor Vehicle" issued on Apr. 16, 1991; U.S. Pat No. 4,988,329 entitled "Final Drive Assembly" issued on Jan. 29, 1991; U.S. Pat No. 4,963,124 entitled "Planetary Gear Transmission for Motor Vehicle" issued on Sep. 16, 1990; U.S. Pat No. 5,019,755 entitled "Electric Motor Drive System" issued on May 28, 1991; and U.S. Pat No. 5,014,800 entitled "Motor Driving Device Provided with Decelerator and Electric Vehicle" issued on May 14, 1991.

Examples of coolant pumps, which may be utilized in accordance with the embodiments of the present invention, may be found in the following U.S. Pat. No. 4,643,135, which issued to Wunsche on Feb. 17, 1987; U.S. Pat No. 4,677,943, which issued to Skinner on Jul. 7, 1987; U.S. Pat No. 4,827,589, which issued to Friedriches on May 9, 1989; U.S. Pat. No. 4,886,989, which issued to Britt on Dec. 12, 1989; and U.S. Pat. No. 4,728,840, which issued to Newhouse on Mar. 1, 1988.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 21 428.6, filed on Jun. 18, 1994, having inventors Dieter Lutz and Asmund Hey, and DE-OS P 44 21 428.6 and DE-PS P 44 21 428.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A planetary transmission for a drive train of a motor vehicle, the drive train having motor means for generating mechanical power, the motor means having an output shaft for outputting mechanical power and means for rotating said output shaft for outputting mechanical power, a housing disposed about at least a portion of said motor means, at least one wheel for receiving mechanical power from the motor to drive the motor vehicle, and a drive shaft connected to the at least one wheel for transferring mechanical power to the at least one wheel, the planetary transmission for connecting said output shaft of said motor means to the drive shaft of the drive train for rotating the drive shaft with said output shaft, said planetary transmission comprising:

a sun gear;

means for non-rotatably connecting said sun gear to the output shaft for rotation of said sun gear with the output shaft;

a ring gear being disposed substantially concentrically about said sun gear;

means for non-rotatably connecting said ring gear to one of: the housing and the drive shaft;

a plurality of planet gears being disposed about said sun gear, between said sun gear and said ring gear, each of said plurality of planet gears being intermeshed with both said sun gear and said ring gear;

a planet gear carrier for rotatably mounting said plurality of planet gears between and intermeshed with said sun gear and said ring gear;

said planet gear carrier comprising means for holding said plurality of planet gears with said planet gear carrier for holding said plurality of planet gears and said planet gear carrier as an integral, unitary unit at least during assembly of said planetary transmission;

means for slidably engaging said integral unitary unit and the other of: the housing and the drive shaft, for non-rotatably connecting said integral unitary unit with the other of: the housing and the drive shaft;

said planet gear carrier comprising:
a first ring-shaped plate having a central opening therein for being disposed about the output shaft, said first ring-shaped plate defining a plane, and said first ring-shaped plate for being disposed about the output shaft with said plane transverse to the output shaft; and
a plurality of axles extending from said ring-shaped plate, for rotatably mounting ones of said plurality of planet gears thereon, said plurality of axles extending substantially perpendicular to said ring-shaped plate;

said ring-shaped plate comprising a radially outer edge, said radially outer edge comprising toothing disposed circumferentially thereabout;

the other of the housing and the drive shaft comprising toothing for interlocking with said toothing of said radially outer edge; and said toothing of said radially outer edge comprising said means for slidably engaging said integral unitary unit and the other of the housing and the drive shaft.

2. The planetary transmission according to claim 1, wherein said plurality of axles and said toothing of said radially outer edge comprise integral components of said ring-shaped plate, integrally formed with said ring-shaped plate as a single unitary component.

3. The planetary transmission according to claim 2, wherein:

said radially outer edge of said ring-shaped plate comprises a cylindrical wall projecting from said ring-shaped plate in the same direction as said axles;

said cylindrical wall comprising said toothing of said ring-shaped plate;

said cylindrical wall having an axial length away from said ring-shaped plate;

said axles having an axial length away from said ring-shaped plate; and said axial length of said cylindrical wall is greater than said axial length of said axles.

4. The planetary transmission according to claim 3, wherein:

said means for connecting said ring gear to one of: the housing and the drive shaft comprises means for connecting said ring gear to the drive shaft;

said ring gear extends axially adjacent said cylindrical wall over at least a portion of the axial length of said cylindrical wall;

said cylindrical wall is disposed radially outwardly of said ring gear; said axles have a first end disposed adjacent said ring-shaped plate, and a second end opposite said first end and disposed away from said ring-shaped plate;

said means for holding further comprises a disc-shaped member disposed adjacent said second end of said axles and parallel to said ring-shaped plate; and said disc-shaped member comprising means for retaining said disc-shaped member on said single unitary component for axially retaining said planet gears on said axles.

5. The planetary transmission according to claim 4, wherein:

said disc-shaped member has an outer radial edge;

said disc-shaped member comprises a plurality of webs disposed at said outer radial edge thereof, substantially transverse to said disc-shaped member and in a direction towards said ring-shaped plate;

said webs being disposed between adjacent ones of said plurality of planet gears, and said webs having a first end disposed adjacent said disc-shaped member and a second end disposed adjacent said ring-shaped plate, said webs comprising said means for retaining said disc-shaped member on said single unitary component;

said radial outer edge of said disc-shaped member extends radially outwardly of said axles and substantially adjacent said ring gear;

said axles comprise cylindrical tubes pressed into said ring-shaped plate;

said second end of said axles comprising cover means closing off said cylindrical tubes;

said axles further comprise bearing sleeves disposed thereabout, said planet gears being disposed rotationally on said bearing sleeves;

said bearing sleeves comprise roller bearings;

said means for retaining said disc-shaped member on said single unitary component comprises a weld between said second end of said webs and said ring-shaped plate;

said plurality of planet gears comprise five planet gears disposed at about 72 degrees in relation to one another in a circumferential direction;

said sun gear has a central opening therein for being disposed on the output shaft of the motor means;

said means for non-rotationally connecting said sun gear to the output shaft comprises toothing disposed radially inwardly within said sun gear, the output shaft comprising toothing for meshing with said toothing of said sun gear;

said planet gears have an axial length on said axles, said axial length of said planet gears being less than said axial length of said axles;

said axles further comprise bearing rings disposed thereabout adjacent said first and second ends of said axles with said planet gears disposed between said bearing rings;

said ring gear comprises a substantially bowl-shaped member, said bowl shaped member having a base portion with a cylindrical wall extending from said base portion, the cylindrical wall of said bowl-shaped member having radially inwardly disposed teeth thereon for intermeshing with said planet gears;

said base portion having a first diameter, said cylindrical wall of said bowl-shaped member having a second diameter, said second diameter being greater than said first diameter;

said bowl-shaped member being disposed substantially coaxial to said single unitary component;

said planetary transmission further comprises a retaining ring disposed about said base portion of said bowl shaped member, and means for fastening said retaining ring to the housing to hold said planetary transmission with the housing; and said planetary transmission further comprises bearing means disposed about said base portion of said bowl-shaped member between said bowl-shaped member and said retaining ring.

6. A method of assembling a planetary transmission in a drive train for a motor vehicle, the drive train having motor means for generating mechanical power, the motor means having an output shaft for outputting mechanical power and means for rotating the output shaft for outputting mechanical power, a housing disposed about at least a portion of the motor means, at least one wheel for receiving mechanical power from the motor means to drive the motor vehicle, a drive shaft connected to the at least one wheel for transferring mechanical power to the at least one wheel, and the planetary transmission for connecting the output shaft of the motor means to the drive shaft of the drive train for rotating the drive shaft with the output shaft, the planetary transmission comprising: a sun gear; means for non-rotatably connecting the sun gear to the output shaft for rotation of the sun gear with the output shaft; a ring gear disposed substantially concentrically about the sun gear; means for non-rotatably connecting the ring gear to one of: the housing and the drive shaft; a plurality of planet gears disposed about the sun gear, between the sun gear and the ring gear, each of the plurality of planet gears being intermeshed with both the sun gear and the ring gear; a planet gear carrier for rotatably mounting the plurality of planet gears between and intermeshed with the sun gear and the ring gear; the planet gear carrier comprising means for holding the plurality of planet gears with the planet gear carrier for holding the plurality of planet gears and the planet gear carrier as an integral, unitary unit at least during assembly of the drive train; said method comprising the steps of:

non-rotatably connecting the sun gear to the output shaft for rotation of the sun gear with the output shaft;

disposing the ring gear substantially concentrically about the sun gear;

non-rotatably connecting the ring gear to the one of: the housing and the drive shaft;

rotatably mounting the plurality of planet gears on the planet gear carrier;

holding the plurality of planet gears on the planet gear carrier to provide the integral, unitary unit;

disposing the integral, unitary unit between the output shaft and the drive shaft;

intermeshing the plurality of planet gears with both the sun gear and the ring gear;

slidably engaging said integral unitary unit and the other of: the housing and the drive shaft, for non-rotatably connecting said integral unitary unit with the other of: the housing and the drive shaft;

forming said planet gear carrier as a first ring-shaped plate having a central opening therein for being disposed about the output shaft, said first ring-shaped plate defining a plane, and said first ring-shaped plate for being disposed about the output shaft with said plane transverse to the output shaft;

providing a plurality of axles extending from said ring-shaped plate, for rotatably mounting ones of said plurality of planet gears thereon, said plurality of axles extending substantially perpendicular to said ring-shaped plate;

providing toothing disposed circumferentially about a radially outer edge of said ring-shaped plate;

providing corresponding toothing on the other of the housing and the drive shaft for interlocking with said toothing of said radially outer edge; and slidably engaging said integral unitary unit and the other of the housing and the drive shaft by slidably intermeshing said teeth of said radially outer edge with the corresponding toothing of the other of the housing and the drive shaft.

7. The method according to claim 6, further comprising forming said plurality of axles and said toothing of said radially outer edge as integral components of said ring-shaped plate to form a single unitary component comprising said axles and said toothing.

8. The method according to claim 7, further comprising:

forming said radially outer edge of said ring-shaped plate as a cylindrical wall projecting from said ring-shaped plate in the same direction as said axles, said forming comprising bending an outer peripheral portion of said ring-shaped plate in an axial direction to form said cylindrical wall, said cylindrical wall having an axial length away from said ring-shaped plate;

forming said toothing of said ring-shaped plate on said cylindrical wall;

forming said ring-shaped plate of sheet metal;

forming said plurality of axles by pressing said plurality of axles out of said ring-shaped plate to deform the sheet metal into cylindrical axles, said axles having an axial length away from said ring-shaped plate; and forming said cylindrical wall and said plurality of axles such that said axial length of said cylindrical wall is greater than said axial length of said axles.

9. The method according to claim 8, wherein:

said connecting of said ring gear to one of: the housing and the drive shaft comprises connecting said ring gear to the drive shaft;

providing said ring gear axially adjacent said cylindrical wall over at least a portion of the axial length of said cylindrical wall;

disposing said cylindrical wall radially outwardly of said ring gear;

disposing a first end of said axles adjacent said ring-shaped plate, and a second end opposite said first end and disposed away from said ring-shaped plate;

providing a disc-shaped member adjacent said second end of said axles and parallel to said ring-shaped plate to provide said means for holding;

configuring said disc-shaped member to comprise means for retaining said disc-shaped member on said single unitary component for axially retaining said planet gears on said axles; and retaining said disc-shaped member on said single unitary unit with said means for retaining.

10. The method according to claim 9, wherein said disc-shaped member has an outer radial edge, and said method further comprises the steps of:

providing said disc-shaped member with a plurality of webs disposed at said outer radial edge thereof, and disposing said webs substantially transverse to said disc-shaped member and in a direction towards said ring-shaped plate;

disposing said webs between adjacent ones of said plurality of planet gears, said webs having a first end disposed adjacent said disc-shaped member and a second disposed adjacent said adjacent said ring-shaped plate;

welding said second edge of said webs to said ring-shaped plate to retain said disc-shaped member on said single unitary unit;

configuring said radial outer edge of said disc-shaped member to extend radially outwardly of said axles and substantially adjacent said ring gear;

disposing bearing sleeves about said axles, and disposing said planet gears rotationally on said bearing sleeves; and providing roller bearings as said bearing sleeves.

11. A planetary transmission for a drive train of a motor vehicle, the drive train having a motor for generating mechanical power, the motor having an output shaft for outputting mechanical power, a housing disposed about at least a portion of the motor, at least one wheel to receive mechanical power from the motor to drive the motor vehicle, and a drive shaft connected to the at least one wheel to transfer mechanical power to the at least one wheel, the planetary transmission to connect said output shaft of the motor to the drive shaft of the drive train for rotating the drive shaft with the output shaft, said planetary transmission comprising:

a sun gear for being non-rotatably connected to the output shaft;

a driven shaft part;

said driven shaft part for being operatively connected to the drive shaft;

a ring gear being non-rotatably connected to one of the housing and the driven shaft part;

said ring gear being disposed substantially concentrically about said sun gear;

a plurality of planet gears being disposed about said sun gear;

said plurality of planet gears being disposed between said sun gear and said ring gear;

said plurality of planet gears each being intermeshed with both said sun gear and said ring gear;

a planet gear carrier;

said planet gear carrier comprising means for rotatably mounting said plurality of planet gears;

said rotatably mounting means comprising:

a ring-shaped plate having a central opening therein for being disposed about the output shaft;

said ring-shaped plate for being disposed transverse to the output shaft;

said ring-shaped plate comprising a radially outer edge;

a plurality of axles;

said plurality of axles extending from said ring-shaped plate in a substantially perpendicular direction to said ring-shaped plate; and said plurality of planet gears each being disposed about one of said plurality of axles;

means for non-rotatably connecting said planet gear carrier with the other of the housing and said driven shaft part;

said planet gear carrier connecting means comprising means for slidably engaging said planet gear carrier and the other of the housing and said driven shaft part; and said slidably engaging means comprising:
- a first toothing being disposed circumferentially about said radially outer edge of said ring-shaped plate; and
- a second toothing being disposed on the other of the housing and the driven shaft part to interlock with said first toothing.

12. The planetary transmission according to claim 11, wherein said plurality of axles, said first toothing and said ring shaped plate together form a single unitary component.

13. The planetary transmission according to claim 12, wherein:
   said radially outer edge of said ring-shaped plate comprises a cylindrical wall;
   said cylindrical wall is disposed substantially perpendicular to said ring-shaped plate;
   said cylindrical wall is disposed adjacent to said plurality of axles;
   said cylindrical wall comprises said first toothing;
   said cylindrical wall having a substantial axial length;
   said plurality of axles each having a substantial axial length; and
   said axial length of said cylindrical wall is greater than said axial length of each of said plurality of axles.

14. The planetary transmission according to claim 13, wherein:
   said ring gear is non-rotatably connected to said driven shaft part;
   said ring gear extends axially adjacent to said cylindrical wall over at least a portion of the axial length of said cylindrical wall;
   said cylindrical wall is disposed radially outward of said ring gear;
   said plurality of axles each comprise a first end disposed adjacent to said ring-shaped plate;
   said plurality of axles each comprise a second end disposed opposite said first end;
   said rotatably mounting means further comprises a disc-shaped member;
   said disc-shaped member is disposed adjacent to said second ends of said plurality of axles;
   said disc-shaped member is disposed substantially parallel to said ring-shaped plate; and
   said disc-shaped member comprises means for retaining said disc-shaped member on said ring-shaped plate to axially retain said plurality of planet gears on said plurality of axles.

15. The planetary transmission according to claim 14, wherein:
   said disc-shaped member comprises an outer radial edge;
   said outer radial edge of said disc-shaped member is disposed radially outward from said plurality of axles;
   said outer radial edge of said disc-shaped member is disposed substantially adjacent to said ring gear;
   said retaining means comprises a plurality of webs;
   said plurality of webs is disposed adjacent to said outer radial edge;
   said plurality of webs is disposed substantially transverse to said disc-shaped member;
   said plurality of webs extends from said disc-shaped member towards said ring-shaped plate;
   said plurality of webs each comprise a first end disposed adjacent to said disc-shaped member and a second end disposed adjacent to said ring-shaped plate;
   each web of said plurality of webs is disposed between adjacent planet gears of said plurality of planet gears;
   said retaining means comprises a weld between said second end of said webs and said ring-shaped plate;
   said plurality of axles comprises cylindrical tubes pressed into said ring-shaped plate;
   said second end of said axles comprises cover means for covering said cylindrical tubes at said second end;
   said rotatably mounting means further comprises bearing sleeves disposed about said plurality of axles;
   said bearing sleeves comprise roller bearings;
   said plurality of planet gears are rotationally disposed on said bearing sleeves;
   said plurality of planet gears comprise five planet gears;
   said five planet gears are equally spaced about said sun gear;
   said sun gear has a central opening for being disposed on the output shaft;
   said sun gear comprises a third toothing disposed on said sun gear and facing the output shaft to mesh with toothing of the output shaft;
   said plurality of planet gears each have an axial length;
   said axial length of said plurality of planet gears is less than said axial length of said plurality of axles;
   said rotatably mounting means further comprises adapter rings disposed about said plurality of axles;
   said adapter rings are disposed adjacent to said first and second ends of said plurality of axles;
   said plurality of planet gears are disposed between said adapter rings;
   said driven shaft part comprises a base portion and a shoulder portion extending from said base portion;
   said base portion of said driven shaft part has a first diameter;
   said shoulder portion of said driven shaft part has a second diameter;
   said second diameter being greater than said first diameter;
   said ring gear is disposed immediately adjacent to said shoulder portion of said driven shaft part; and
   said ring gear comprises radially inwardly disposed teeth to intermesh with said planet gears.

16. The planetary transmission according to claim 15 further comprises:
   a retaining ring disposed adjacent to said base portion of said driven shaft part;
   means for fastening said retaining ring to the housing to hold said planetary transmission within the housing;
   a bearing disposed about said base portion of said driven shaft part;
   said bearing is disposed between said driven shaft part and said retaining ring;
   a kinetic seal; and said kinetic seal is disposed between said driven shaft part and said retaining ring.

17. The planetary transmission according to claim 13, wherein:
   said ring gear is connected to said housing; and
   said planet gear carrier connecting means being means for connecting said planet gear carrier and said driven shaft part.

* * * * *

UNITED STATES PATENT AND TRADEMARK OFFICE
CERTIFICATE OF CORRECTION

PATENT NO. : 5,685,798
DATED : November 11, 1997
INVENTOR(S) : Dieter LUTZ and Asmund HEY It is certified that error appears in the above-identified patent and that said Letters Patent is hereby corrected as shown below:

In column 11, line 11, after 'housing', delete "tan" and insert --can--.

Signed and Sealed this

Twenty-sixth Day of May, 1998

Attest:

BRUCE LEHMAN

Attesting Officer    Commissioner of Patents and Trademarks